United States Patent [19]

Dijkstra et al.

[11] 4,188,433

[45] Feb. 12, 1980

[54] RECORD CARRIER IN DISK FORM HAVING COVER LAYERS

[75] Inventors: Rinse Dijkstra; Arnoldus J. M. van den Broek; Gerardus J. M. Lippits, all of Eindhoven, Netherlands

[73] Assignee: U.S. Philips Corporation, New York, N.Y.

[21] Appl. No.: 926,953

[22] Filed: Jul. 20, 1978

[30] Foreign Application Priority Data

Dec. 12, 1977 [NL] Netherlands ............... 7713710

[51] Int. Cl.² ............ G11B 7/24; B32B 27/08; B32B 27/30
[52] U.S. Cl. .................. 428/64; 179/100.3 V; 346/137; 346/135.1; 358/128.5; 428/332; 428/339; 428/913; 428/442; 428/463; 428/520; 428/522; 428/412
[58] Field of Search .............. 346/135, 137; 428/64, 428/164, 65, 913, 442, 463, 520, 522; 274/41.6 S, 41 A, 42 R; 358/128; 179/100.3 V

[56] References Cited

U.S. PATENT DOCUMENTS

| | | | |
|---|---|---|---|
| 3,113,179 | 12/1963 | Glenn | 346/135 |
| 3,971,874 | 7/1976 | Ohta et al. | 428/913 X |
| 4,020,278 | 4/1977 | Carre et al. | 179/100.3 V |
| 4,052,280 | 10/1977 | McGinnis | 428/913 X |
| 4,057,831 | 11/1977 | Jacobs et al. | 428/64 X |
| 4,069,487 | 1/1978 | Kasai et al. | 346/135 X |
| 4,126,726 | 11/1978 | Soeding | 428/409 X |

FOREIGN PATENT DOCUMENTS

2615605 10/1977 Fed. Rep. of Germany .

Primary Examiner—George F. Lesmes
Assistant Examiner—Alexander S. Thomas
Attorney, Agent, or Firm—Norman N. Spain

[57] ABSTRACT

The invention relates to a disk-shaped record carrier, for example a video plate, which is provided on one side or on both sides with a radiation-reflecting surface structure in the form of an information track consisting of blocks and pits on which a reflecting layer of metal is provided. The plate can be read optically. According to the invention the reflecting metal layer is provided with a cover layer which is formed by a transparent plate which is connected to the metal surface by means of a radiation-curable lacquer. The lacquer is preferably a U.V. curing lacquer and contains a protic mixture of acrylic acid esters. The transparent plate is also preferably manufactured from a transparent synthetic resin and has a thickness of 200 μm.

4 Claims, 1 Drawing Figure

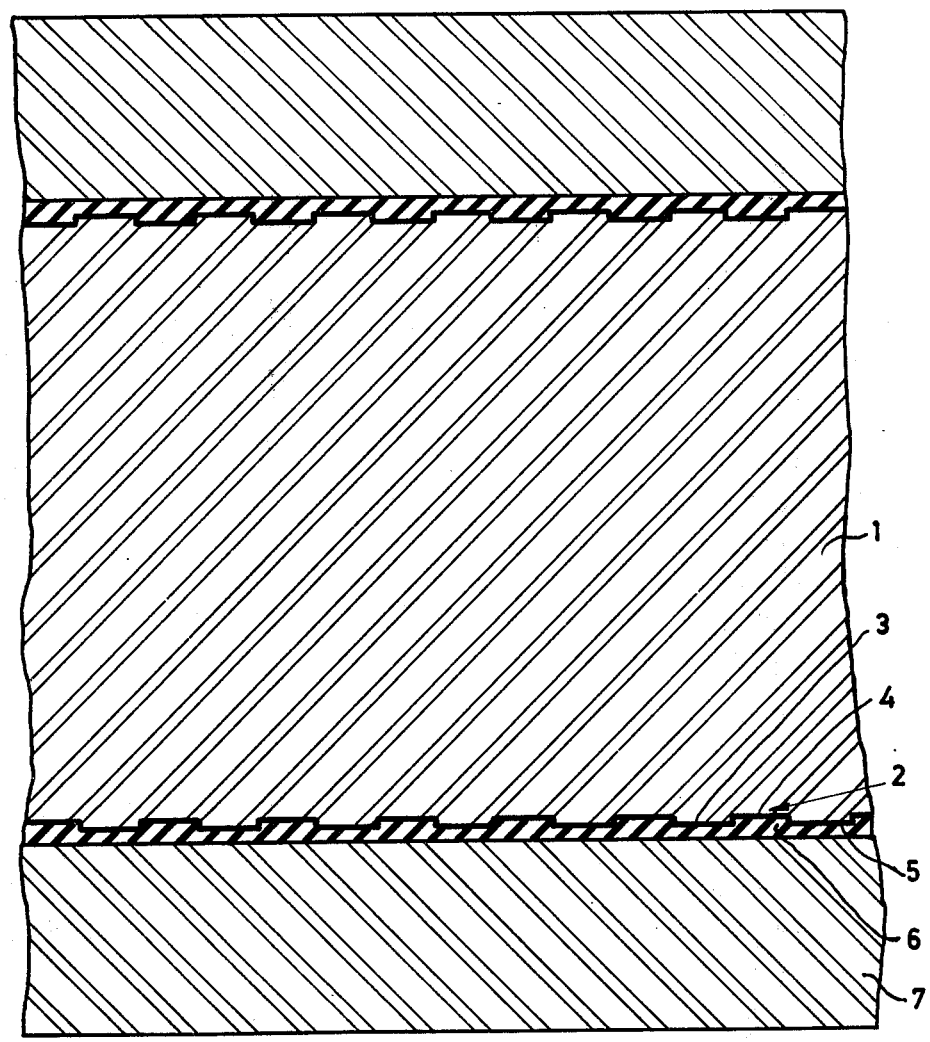

RECORD CARRIER IN DISK FORM HAVING COVER LAYERS

The invention relates to a record carrier in disk form which is provided on one side or on both sides with a radiation-reflecting structure comprising the information which can be read optically, the reflecting structure having a radiation-permeable cover layer.

It concerns in particular a record carrier which has a well defined radiation-reflecting structure in the form of an information track consisting of spiral-like or concentric circles built up from pits of small dimensions, for example, a vapour-deposited metal layer, for example an aluminum layer. The radiation-reflecting layer has a small thickness of approximately 300–500 Å and accurately follows the profile of the pits and the intermediately located higher parts, termed blocks, so that a reflecting structure is obtained of pits situated at the same level and blocks situated at the same but higher level, pits and blocks having the same high coefficient of reflection. The difference in level between pits and blocks corresponds to a quarter of the wavelength of the energy-rich radiation with which the reflecting structure can be read. A suitable reading radiation is a laser beam. The reflecting structure is covered with a radiation-permeable layer and is read in reflection by scanning with a laser beam, the laser beam traversing the radiation-permeable layer twice.

As a result of reflection against the reflecting structure the laser beam is modulated in accordance with the reflecting structure, so in accordance with the stored information. The radiation-permeable layer protects the reflecting optical structure and has a minimum thickness of approximately 200–300$\mu$ so that the dust particles or scratches present on the surface of the radiation-permeable layer are kept beyond the depth of definition of the objective which focuses the laser beam on the reflecting structure.

A record carrier of the kind mentioned in the preamble is known from German Auslegeschrift No. 26.15.605. According to the text of said Auslegeschrift, a transparent lacquer layer is used as a radiation-permeable cover layer. According to the insight gained by Applicants this has the following disadvantages.

It is very difficult to provide a stable lacquer layer of at least 200$\mu$ and in practice usually 300–400$\mu$. Such thick lacquer layers show considerable internal stress so that the lacquer layer readily peels off the substrate, which in this case is the radiation-reflecting layer. Stresses are also caused during curing the lacquer and differences in the degree of polymerization of the lacquer can occur. The outer peel of the lacquer layer will for example cure or polymerise before the deeper-situated parts of the lacquer layer. A polymerization initiator present in the lacquer layer will moreover be more active in the outer parts of the lacquer layer than in the deeper-situated parts. The curing time is comparatively long so that attack of the substrate by the liquid lacquer and in particular by the initiator or activator present in the lacquer may take place. Another result of a comparatively long curing time is that an accurate positioning of the lacquer is considerably impeded. It is difficult to make the surface of the lacquer layer smooth. The resulting unevenness (of the lacquer layer moreover adversely influences the optical readability of the stored information. As a result of differences in coefficients of expansion between the lacquer layer and the disk-shaped support plate under the influence of heat and moisture the possibility of warping the record carrier or peeling and delamination of the lacquer layer exists. Furthermore it should be borne in mind that air oxygen generally impedes a complete curing of the surface of the lacquer layer so that the curing of the provided lacquer layer must take place in an inert atmosphere, for example a nitrogen atmosphere.

Applicants have developed a disk-shaped record carrier of the kind mentioned in the preamble which mitigates the above-mentioned disadvantages and which is characterized in that the cover layer is formed by a radiation-permeable disk-shaped cover plate which is connected to the reflecting structure by means of a radiation-curable lacquer.

The transparent disk-shaped cover plate may be a glass plate but is preferably a synthetic resin plate having a thickness of 0.2–1 mm. Suitable transparent plates of synthetic resin are, for example, plates of polyvinyl chloride, polyvinyl chloride/acetate copolymer, polycarbonate or polymethyl methacrylate.

The layer thickness of the radiation-curable lacquer is small and is preferably at most 30$\mu$.

A very suitable lacquer is an ultraviolet light-curable lacquer. Those skilled in the art can easily make a choice from the commercially available U.V.-curable lacquers in which it is a requirement, of course, that the selected lacquer after curing must readily adhere to the metal of the radiation-reflecting structure and to the material, for example synthetic resin, of the transparent cover plate used.

In a favourable form of the record carrier according to the invention a U.V.curable lacquer is used which contains a protic mixture of acrylic acid esters. The protic character of the mixture, that is to say the possibility of splitting off protons, is of importance to obtain a good adhesion to the metal surface of the reflecting structure. The protic character is obtained by incorporating in the mixture acrylic acid esters which are protic.

A very suitable mixture of acrylic acid esters which is used in a further preferred form of the record carrier according to the invention comprises as a protic constituent a hydroxy alkyl acrylate or amino alkyl acrylate. The quantity of hydroxy alkyl alcrylate or amino alkyl acrylate in the mixture of acrylic acid esters is not retricted to narrow limits and will generally be from 20 to 80% by weight. Readily useful is, for example, 2-hydroxyethyl acrylate.

Examples of other readily useful esters of acrylic acids are low molecular mono esters, diesters, triesters or tetraesters. Of these may be mentioned by way of example the monoacrylates, in particular alkyl acrylates, for example ethyl acrylate and 2-ethylhexyl acrylate, furthermore diacrylates, for example alkanediol diacrylates and alkene-glycol diacrylates, as well as triacrylates, such as trimethylol propane triacrylate. Also readily useful are the acrylic acid ester of oligomers, such as epoxy acrylate and urethane acrylate. The hydroxy groups and amino groups present in said substances produce a protic character.

A composition of a readily useful U.V.-curable lacquer on the basis of acrylic acid esters is as follows:
  60% by weight 2-hydroxyethyl acrylate
  20% by weight 2-ethylhexyl acrylate
  18% by weight 1,1,1-trimethylol propane triacrylate and
  2% by weight photo-initiator.

The photoinitiator is usually an aromatic carbonyl compound, for example, a benzoin-isobutyl ether known by the trade name Vicure.

The record carrier according to the invention can be manufactured in a simple manner by providing a disk-shaped plate of synthetic resin, which comprises on one side or on both sides an information track built up from blocks and pits, with a thin metal layer. A suitable reflecting thin metal layer is, for example, a vapour-deposited Al-layer having a very small thickness of approximately 300–500 A. The synthetic resin plate itself can be manufactured according to a usual pressing process by means of moulds in which a quantity of plastic synthetic resin, for example polyvinyl chloride, polyvinyl chloride/acetate copolymer, polycarbonate or plexiglass is deformed under elevated temperature and pressure, the surface structure present on the mould or moulds being pressed in one or both surfaces.

A small quantity of the radiation-curable thin-liquid lacquer is then provided on the reflecting metal layer by means of a pouring process, a spraying process or a centrifuging process. The transparent cover plate is provided on the lacquer layer which has a layer thickness of approximately 30 $\mu$m while avoiding air inclusions. A suitable method of applying the lacquer layer and the cover plate is to have a cover plate which is deformed in a slightly spherosymmetrical manner and to press the plate against a quantity of lacquer provided in the centre of said substrate. On pressing the cover plate from the centre the plate becomes flat and the lacquer liquid is rolled out over the surface of the substrate, which is the metal layer. This process is described inter alia in the non-prepublished Netherlands Patent Application (PHN 8712) in the name of Applicants.

The lacquer layer is then exposed to ultraviolet light via the cover plate, the lacquer being polymerised in a very short period of time and adhering on one side to the metal layer and on the other side to the surface of the cover plate. The curing time depends inter alia on the intensity of the U.V. light used and on the composition of the lacquer and usually varies from a few tenths of a second to a few minutes.

The thin lacquer layer polymerizes rapidly and homogeneously at normal ambient temperature. The rapid curing as well as the possibility of being capable of readily determining and adjusting the instant of curing (gluing), namely by switching on the ultraviolet light, enable an accurate positioning and adhesion of the cover plate to the metal layer. Even an unbalance, if any, of the disk-shaped plate of synthetic resin can be compensated for by an exact positioning and subsequent gluing of the cover plate.

As a result of the rapid curing of the thin lacquer layer the degree of polymerisation is equally large everywhere, which reduces the possibility of internal stresses. In addition there is no attack of the substrate. Since the lacquer layer is enclosed between substrate and cover plate, no oxygen inhibition takes place and curing may be carried out in normal air atmosphere. Furthermore, the moisture and temperature loads of the enclosed lacquer layer are comparatively small so that less stringent requirements may be imposed upon the stability of moisture and temperature of the lacquer layer.

The lacquer layer used in the disk-shaped record carrier according to the invention is sufficiently flexible under operating conditions to be able to compensate for differences in expansion of the lacquer layer on the one hand and the cover plate and substrate on the other hand, without the adhesion of the lacquer layer to substrate and cover plate being interrupted. In connection herewith it may be noted that it is to be preferred to choose the same synthetic resin for the substrate and the cover plate. The substrate material is not traversed by the scanning beam and need consequently not be optically bright and in contrast with the material of the cover plate may comprise additions so that the initial brightness is lost or a large double refraction arises. Such additions, as for example soot or reinforcing material, may be of importance for increasing the mechanical, thermal or chemical stability of the substrate. By way of example, the cover plate may be a transparent PVC and the substrate may be PVC comprising soot and other ancillary substances, such as thermal and chemical stabilizers.

The invention will be described in greater detail with reference to the drawing, the sole FIGURE of which is a cross-sectional view of a disk-shaped record carrier according to the invention.

Reference numeral 1 in this FIGURE denotes a 1 mm thick plate of polycarbonate which is provided on both sides with a structure 2 which contains the information and is formed by pits 3 and blocks 4. Pits 3 and blocks 4 are not drawn to scale. The dimensions thereof lie in the order of magnitude of 1 $\mu$m. The structure 2 has a vapour-deposited aluminum layer 5 in a thickness of approximately 300 A. An ultraviolet light-cured resin layer 6 is present on aluminum layer 5 and is connected thereto in an adhering manner and is connected in an adhering manner on the surface remote from the layer 5 to a 0.25 mm thick cover plate 7 of vinylchloride-vinylacetate copolymer.

The record carrier shown in the FIGURE is manufactured by providing a plate of polycarbonate, which is manufactured by a pressing process by means of moulds and which is provided on both sides with an information-containing structure, with an aluminum layer having a thickness of 300 A which is vapour-deposited in a vacuum bell at a pressure of $10^{-4}$ to $10^{-5}$ Torr. The plate is now disposed horizontally and on the upper surface a small quantity (approximately 4–10 cc) of an ultraviolet light-curable lacquer composition is poured in the centre whose composition is:

60% by weight 2-hydroxy-ethyl acrylate
20% by weight 2-ethyl hexyl acrylate
18% by weight 1,1,1-trimethylol propane triacrylate and
2% by weight photo-initiator (Vicure 10).

A 0.25 mm thick cover plate of vinylchloride-vinylacetate copolymer is then disposed over the polycarbonate plate provided with lacquer in such manner that the lacquer spreads over the surface of the polycarbonate plate without air bubble inclusions. For this purpose the cover plate is curved to be slightly spherosymmetrical and is pressed against the lacquer deposit with its central part. Upon further pressing-on the lacquer will move over the polycarbonate plate with a circular liquid front and the curved cover plate will also be smoothed. In the final position when the liquid front has reached the edge of the polycarbonate plate, the cover plate will engage the resulting lacquer layer in a smooth manner and without stress as a result of its natural stress release.

The lacquer layer is then exposed to ultraviolet light from a 500 W mercury lamp via the cover plate for 1–2 minutes. The lacquer layer is cured and is connected in an adhering manner to on the one side the cover plate and on the other side to the aluminum layer present on the polycarbonate layer. The plate is then turned and the untreated side of the polycarbonate plate comprising an aluminum layer is provided with a cover plate connected thereto via a lacquer layer in the same manner as described above.

What is claimed is:

1. A disk shaped record carrier comprising a substrate, a radiation-reflecting layer of metal on said substrate containing at least one optically readable information path, a radiation-transparent cover plate of a thickness of 0.2-1 mm, formed of glass or a transparent synthetic resin material, covering said reflective metal layer and joined to said reflective metal layer by an ultraviolet curable lacquer composition layer of at most $30\mu$ in thickness.

2. The record carrier of claim 1 wherein the ultraviolet curable lacquer composition contains a protic mixture of acrylic acid esters.

3. The record carrier of claim 2 wherein the protic mixture of acrylic acid esters comprises hydroxy alkyl acrylates or amino alkyl acrylates.

4. The record carrier of claim 3 wherein the cover plate has a thickness of from 0.2-1 mm and is a transparent synthetic resin selected from the group consisting of polyvinyl chloride, polyvinyl chloride-polyvinyl acetate copolymer, polycarbonate and polymethyl methacrylate.

* * * * *